United States Patent
Vick et al.

(10) Patent No.: US 8,351,593 B2
(45) Date of Patent: Jan. 8, 2013

(54) EMERGENCY RECORDING DURING VOIP SESSION

(75) Inventors: Steve Vick, Aurora, IL (US); Bob Mulrow, Wheaton, IL (US)

(73) Assignee: Aspect Software, Inc., Lombard, IL (US)

(*) Notice: Subject to any disclaimer, the term of this patent is extended or adjusted under 35 U.S.C. 154(b) by 1441 days.

(21) Appl. No.: 11/556,749

(22) Filed: Nov. 6, 2006

(65) Prior Publication Data
US 2008/0107247 A1    May 8, 2008

(51) Int. Cl.
*H04M 3/00* (2006.01)
*H04M 5/00* (2006.01)

(52) U.S. Cl. ......... 379/265.01; 379/265.02; 379/265.03; 379/265.09

(58) Field of Classification Search ............ 379/265.01–265.14, 266.01–266.1, 379/309
See application file for complete search history.

(56) References Cited

U.S. PATENT DOCUMENTS

| | | | |
|---|---|---|---|
| 5,586,178 A * | 12/1996 | Koenig et al. | 379/265.03 |
| 6,721,416 B1 * | 4/2004 | Farrell | 379/265.07 |
| 6,738,813 B1 * | 5/2004 | Reichman | 709/224 |
| 7,835,358 B2 * | 11/2010 | Gallatin et al. | 370/390 |
| 2002/0184197 A1 * | 12/2002 | He et al. | 707/3 |
| 2003/0169856 A1 * | 9/2003 | Elazar et al. | 379/67.1 |
| 2005/0084088 A1 * | 4/2005 | Hamilton | 379/207.02 |
| 2006/0010321 A1 * | 1/2006 | Nakamura et al. | 713/168 |
| 2007/0019634 A1 * | 1/2007 | Fisher et al. | 370/352 |
| 2007/0226254 A1 * | 9/2007 | Moraveji | 707/104.1 |
| 2008/0212571 A1 * | 9/2008 | Ilan et al. | 370/352 |
| 2009/0016522 A1 * | 1/2009 | Torres et al. | 379/265.06 |
| 2011/0216771 A1 * | 9/2011 | Gallatin et al. | 370/392 |

* cited by examiner

*Primary Examiner* — William Deane, Jr.
(74) *Attorney, Agent, or Firm* — Husch Blackwell LLP

(57) ABSTRACT

A method and apparatus are provided for recording a call between a client and an agent through an automatic contact distributor. The method includes the steps of the automatic contact distributor receiving a recording request from the agent, the automatic contact distributor activating a recording program, the recording program sniffing traffic within a packet telephone of the agent to detect packets exchanged between the agent and client and the recording program recording the detected packets between the agent and customer.

24 Claims, 1 Drawing Sheet

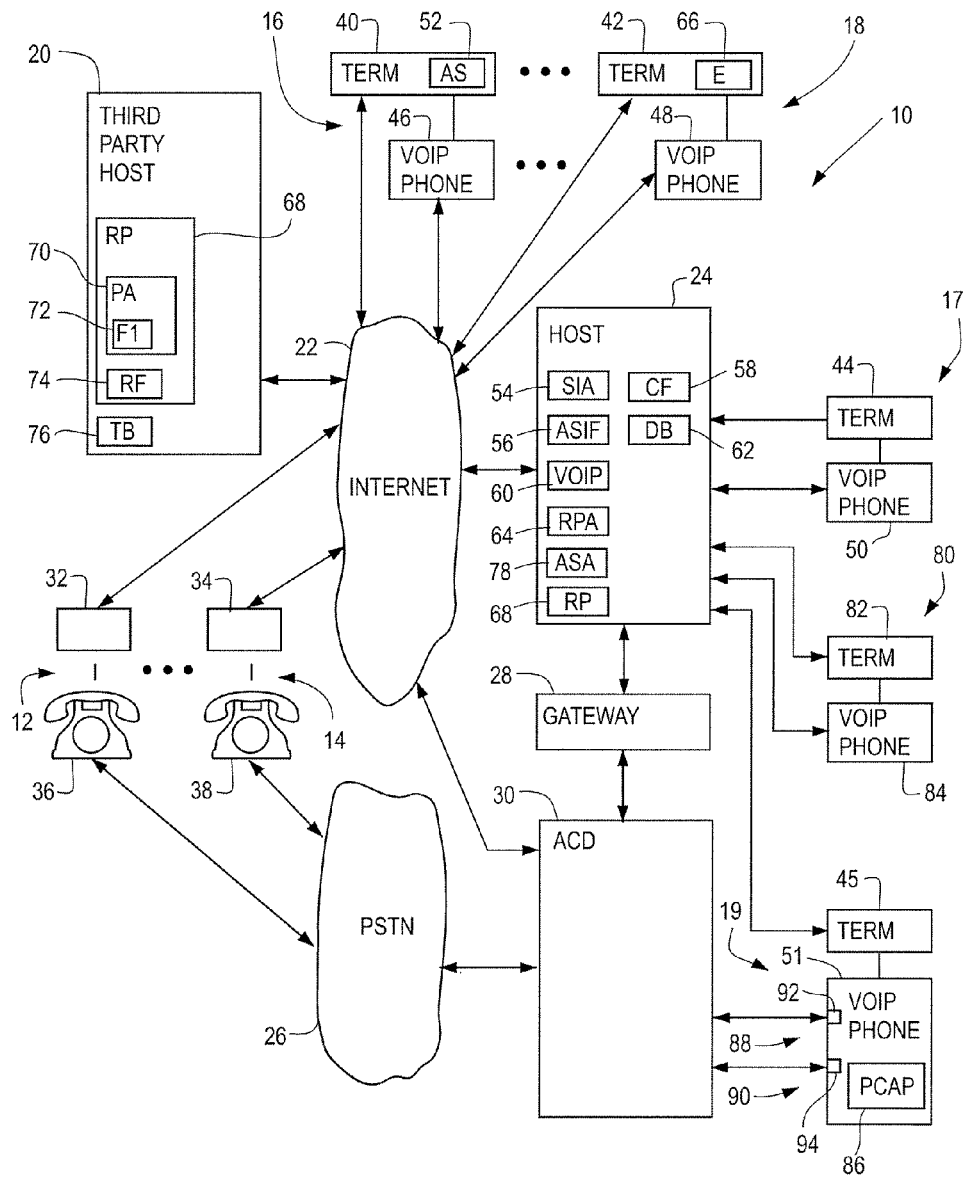

US 8,351,593 B2

EMERGENCY RECORDING DURING VOIP SESSION

FIELD OF THE INVENTION

The field of the invention relates to contact centers and more particularly to the recording of calls through a contact center.

BACKGROUND OF THE INVENTION

Contact centers are generally known. Contact centers are typically used by organizations to handle contacts with clients.

In order to use a contact center, the organization may promulgate (by advertising or otherwise) one or more communication system identifiers (e.g., telephone numbers, e-mail addresses, etc.) through which a client may contact the organization. Alternatively, the organization may obtain a list of communication system identifiers and automatically place calls to clients.

Contacts with clients may be established through any of a number of different communication system mediums (e.g., PSTN, e-mail, chat, websites, etc.). Once a contact is established, a controller of the contact center may select and assign the call to an agent of the organization.

Selection of an agent may be based upon any of a number of criteria (e.g., longest available agent, skill, etc.). When based upon skill, the controller may first attempt to determine a purpose of the call. Purpose may be determined from the communication system identifier used to contact the organization or upon the identity of the client.

Alternatively, in the case of a call originating from a website, the purpose of a call may be determined from a web page from which the call originated. In the case of the PSTN, the purpose of the call may be determined from the number dialed as provided by DNIS information.

The identity of the client may be determined from call associated information. Call associated information may include ANI information delivered along with a PSTN call or a source IP address in the case of e-mail or chat.

In some contact centers, voice and data communication with agents is centralized within the contact center and is accomplished under a packet format. In such cases, voice calls with clients are supported (at least from the contact center to the agent) under a VoIP format. A gateway within the contact center may convert between the VoIP on the agent side of the gateway and a switched circuit format, for example, where the contact with the client is established through the PSTN.

While the use of VoIP on the agent side gives agents far more flexibility in being able to work from remote sites, VoIP complicates agent support. For example, where an agent perceives a threat, the agent may wish to record a call. However, there are no network devices that are capable of recording VoIP calls without the unnecessary difficulty of creating a three party connection. Accordingly, a need exists for a way of recording VoIP calls that can be placed within the communication system rather than on the agent's computer.

SUMMARY

A method and apparatus are provided for recording a call between a client and an agent through an automatic contact distributor. The method includes the steps of the automatic contact distributor receiving a recording request from the agent, the automatic contact distributor activating a recording program, the recording program sniffing traffic within a packet telephone of the agent to detect packets exchanged between the agent and client and the recording program recording the detected packets between the agent and customer.

BRIEF DESCRIPTION OF THE DRAWINGS

FIG. 1 is a block diagram of a system for recording a call between a client and an agent of an automatic contact distributor in accordance with an illustrated embodiment of the invention.

DETAILED DESCRIPTION OF AN ILLUSTRATED EMBODIMENT

FIG. 1 is a block diagram of an automatic contact distribution system 10 with Internet recording capabilities shown generally in accordance with an illustrated embodiment of the invention. The system 10 may be used by any of a number of different organizations (e.g., commercial, political, environmental, etc.) in support of communications with clients 12, 14 of the organization. For example, an environmental organization may use the system 10 to place calls to, or receive calls from, clients 12, 14 for purposes of advocating a particular environmental position.

Each client 12, 14 may be assumed to have a terminal 32, 34 and a telephone 36, 38. Clients 12, 14 may use the terminal 32, 34 and/or telephone 36, 38 to place/receive calls to/from the organization through the system 10.

Included within the system 10 may be two or more agent stations 16, 17, 18, 19. Each agent station 16, 17, 18, 19 may include a respective terminal 40, 42, 44, 45 and a packet (VoIP) telephone 46, 48, 50, 51.

The packet telephones 46, 48, 50, 51 may each be provided with first and second Ethernet interfaces 92, 94 and associated IP addresses 88, 90. The first Ethernet interface 92 and address 88 may be used for exchanging voice packets with clients 12, 14. A second Ethernet interface 94 and IP address 90 may be provided for purposes of packet sniffing, as described in more detail below.

Each VoIP telephone 46, 48, 50, 51 is provided with its own unique MAC number. Associated with the MAC number is a telephone number. Each time a VoIP telephone 46, 48, 50, 51 is connected to the network, the VoIP telephone 46, 48, 50, 51 searches for the nearest server and registers its presence and availability to receive calls.

Each terminal 40, 42, 44, 45 is also provided with an access softphone (program) 52. In order to sign into the system 10 to receive calls, an agent 16, 17, 18, 19 activates the softphone software 52, enters a unique agent identifier and a telephone number of the associated VoIP telephone 46, 48, 50, 51.

The softphone software 52 sends the agent identifier and telephone number to an agent sign-in application 54 within the host 24. The sign-in application 54 signs the agent 16, 17, 18, 19 into the system as being available for handling calls. To sign the agent 16, 17, 18, 19 into the system 10, the sign-in application 54 may save the agent ID, a port ID of the agent, an IP address (e.g., logical workstation number (LWN), URL, etc.) of the terminal 40, 42, 44, 45 and also the VoIP IP address 88 and second IP address 90 of the associated VoIP telephone 46, 48, 50, 51 into a respective agent sign-in file 56. To complete the process, the sign-in application 54 places a call to the telephone number provided by the signing-in agent 16, 17, 18, 19. When the agent answers the call on his VoIP telephone 46, 48, 50, 51, the sign-in process is complete.

Once an agent 16, 17, 18, 19 signs into the system 10, the agent is able to receive calls from clients 12, 14. As calls are received from clients 12, 14, they may arrive through the Internet 22 or through the PSTN 26. Alternately, the system 10 may place calls to clients 12, 14 through the Internet 22 or PSTN 26.

In the case of a call from a client 12, 14 through the PSTN 26, an automatic call distributor (ACD) 30 may receive the call along with call associated information. The ACD 30 may receive the call and transfer any call associated information (e.g., ANI, DNIS, etc.) to the host 24.

The host 24 may receive the transferred information, assign a unique call ID number and open a call file 58 to track the call. The host 24 may collect the transferred call associated information, the call ID as well as an identifier of a trunk upon which the call was received and place the information into the call file 58.

An agent selection application 78 within the host 24 may select an agent 16, 17, 18, 19 to handle the call. Selection of an agent 16, 17, 18, 19 may be based upon any of a number of different criteria (e.g., longest available, most skilled, etc.).

Once the host 24 has selected an agent 16, 17, 18, 19, the host 24 may set up a connection between the selected agent 16, 17, 18, 19 and client 12, 14. In this regard, a gateway 28 may be provided between the ACD 30 and host 24 in support of a connection between the client 12, 14 and host 24. The gateway 28 converts voice information from a switched circuit format to a packet format. The host 24 may allocate a channel through the gateway 28 and also a VoIP application 60 within the host 24 or gateway 28 in support of a voice connection between the agent 16, 17, 18, 19 and the client 12, 14.

The host 24 may then send a Session Initiation Protocol (SIP) INVITE to a telephone of the selected agent 46, 48, 50, 51. The phone 46, 48, 50, 51 of the selected agent 16, 17, 18, 19 may respond with a "200 OK" and begin ringing. The selected agent 16, 17, 18, 19 may answer the phone 46, 48, 50, 51 and begin conversing with the client. During the conversation, the selected agent 16, 17, 18, 19 may access a database 62 within the host 24 make entries and otherwise address the concerns of the client 12, 14.

Alternatively, a client 12, 14 may place a call to the organization using a VoIP telephone on a terminal 32, 34. The host 24 may detect the call and select an agent substantially as described above. The host 24 may function to redirect packets between the selected agent 16, 17, 18, 19 and client 12, 14 or may simply transfer the call to the agent 16, 17, 18, 19 by functioning as a SIP REDIRECT SERVER.

Upon occasion, the client 12, 14 may present a situation where the agent 16, 17, 18, 19 may want to record the call. This situation may arise in the context where the client 12, 14 makes threats or is otherwise abusive.

In order to begin recording the call, the agent 16, 17, 18, 19 may activate an emergency recording request softkey 66 on the agent terminal 40, 42, 44, 45. Activation of the record softkey 66 causes the terminal to send a recording request (e.g., a SIP INVITE such as "INVITE: SOS@SPECTRUM.COM") to a recording setup application 64 within the host 24. The Session Description Protocol (SDP) of the SIP recording request may include G711 recording capabilities.

The packet telephone 46, 48, 50, 51 of the requesting agent 16, 17, 18, 19 or the recording setup application 64 may notify a supervisor 80 about the request for recording. In this regard, the recording setup application 64 may send a SIP INVITE (e.g., "SOS.SUPERVISOR@SPECTRUM.COM") to a telephone 84 of the supervisor 80 allowing the supervisor to be joined into the call or to monitor the call. Upon detection of the SIP INVITE, the supervisor's phone 84 may begin to ring. The supervisor 80 may simply acknowledge the INVITE by activating a softkey on a screen of the phone 84 or answer the INVITE and be joined to the call.

Additionally or alternately, the recording setup application 64 may send a notice or e-mail that is displayed on a terminal 82 of the supervisor notifying the supervisor 80 of the request (e.g., timestamp, switch call ID, SIP CallID, To:/From:/via: information, CallTags and "CallID@hostname.com"). The information within the notice or e-mail may provide a reference (e.g., softkey) that the supervisor 80 can use to later play back the recording.

Within the host 24, the recording setup application 64 may take steps to being recording the conversation. The recording setup application 64 may first recover an IP address of the terminal of the selected agent 16, 17, 18, 19 from within the "from" field of the recording request. With the IP address of the selected agent, the recording setup application 64 may access the agent sign-in file 56 and the call file 58 created for the call to recover an IP address of the client 12, 14, the VoIP address 88 and the second IP address 90 of the selected agent 16, 17, 18, 19.

With the IP addresses 88, 90 of the selected agent 16, 17, 18, 19 and client 12, 14, the recording setup application 64 may send a recording request under a TCP/IP format (e.g., as a transaction link message) to a recording processor 68 either within the host 24 or within a third party host 20 (FIG. 1 shows the recording processor 68 in both location even though only one would be used). The recording processor 68 may function to collect and record packets exchanged between the agent 16, 17, 18, 19 and client 12, 14.

Contained or associated with the recording processor 68 is a protocol or network analyzer 70. The protocol analyzer 70 functions to sniff traffic within a packet telephone 46, 48, 50, 51 of an agent 16, 17, 18, 19. As used herein, the term "sniffing traffic" means the use of a network analyzer or protocol analyzer program (e.g., Ethereal) to detect a particular type of traffic within the packet telephone 46, 48, 50, 51 and causing copies of the detected traffic to be routed to the recording processor 68. In the case at hand, the type of traffic that the protocol analyzer 70 detects is any packet between the selected agent 16, 17, 18, 19 and the client 12, 14. To do this, the recording processor 68 may construct a sniffing filter F1 72 using the VoIP IP address 88 of the selected agent 16, 17, 18, 19 and the IP address of the client 12, 14.

In order to allow sniffing within the packet telephone 46, 48, 50, 51, an application programming interface for packet capturing tool (e.g., Pcap, libpcap, WinPcap, etc.) 86 is provided within each of the agent packet telephones 46, 48, 50, 51. The packet capturing tool 86 may be accessed through the second IP address 90 (hereinafter referred to as the "Pcap IP address 90") of the packet telephone 46, 48, 50, 51. The Pcap IP address 90 is used by the protocol analyzer 70 to sniff traffic within the packet telephone 46, 48, 50, 51 by controlling the Pcap tool 86 within the packet telephone 46, 48, 50, 51.

In order to begin recording, the protocol analyzer 70 may transfer the filter 72 to the Pcap IP address 90 of the packet telephone 46, 48, 50, 51 of the agent 16, 17, 18, 19 along with instructions to begin sniffing for packets that meet the criteria of the filter 72. Upon receipt of the filter 72, the Pcap tool 86 begins capturing packets exchanged between the agent 16, 17, 18, 19 and client 12, 14 and transfers the packets to the protocol analyzer 70.

The recording application 68 and protocol analyzer 70 may also retrieve and record contemporaneous traffic between the agent 16, 17, 18, 19 and other entities for purposes of understanding the context of the perceived threat. For example, was the agent 16, 17, 18, 19 engaged in too many conversations? Was the agent confused as to the scope of the threat?

In this case, the protocol analyzer 70 may expand the filter 72 to include any packet from the agent 16, 17, 18, 19. Packets received by the protocol analyzer 70 may be transferred to the recording processor 68 where the destination IP address may be compared with the IP address of the client 12, 14. If the IP addresses are different, then the protocol analyzer 70 may open a new thread to capture packets between the agent 16, 17, 18, 19 and the other party identified by the different IP address.

As the packets exchanged between the agent 16, 17, 18, 19 and client 12, 14 are received, the recording processor 68 may retrieve time stamps from a time base 76 and associate a time stamp with each packet. The time stamped packets may be saved under a G711 format as a WAV file using Transport Level Security (TLS) within a recording file 74.

The recording processor 68 may continue to record packets until the recording processing application 64 detects that the agent 16, 17, 19 has hung up or otherwise termination the call. Upon detection of this event, the recording processing application 64 may send another transaction link message to the host 20 terminating the recording session.

A specific embodiment of method and apparatus for recording VoIP calls has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of recording a VOIP call between a client and an agent through an automatic contact distributor comprising:
    the automatic contact distributor receiving a recording request from a VoIP packet telephone of the agent, the VoIP packet telephone having a first VoIP network interface for exchanging voice packets and a second packet network interface for packet sniffing;
    the automatic contact distributor activating a recording program in response to the recording request;
    the recording program sniffing traffic within a packet telephone of the agent using the second network interface to detect packets of the VOIP call exchanged between the agent and client; and
    the recording program recording the detected packets between the agent and customer.

2. The method of recording calls as in claim 1 wherein the call further comprises a VoIP call and wherein the recording program utilizes a packet capturing tool with the agent's VoIP packet telephone, the packet capturing tool accessed via the second network interface.

3. The method of recording calls as in claim 2 wherein the step of the automatic contact distributor receiving the recording request further comprises the agent sending the recording request to the automatic contact distributor under a Session Initiation Protocol by the agent activating a record soft-key.

4. The method of recording calls as in claim 1 further comprising sending a Session Initiation Protocol INVITE message to a supervisory to notify the supervisor of the recording request and joining the supervisor to the call.

5. The method of recording calls as in claim 4 wherein the step of joining the supervisor to the call further comprises sending a Session Initiation Protocol JOIN message to an Internet telephone of the supervisor.

6. The method of recording calls as in claim 2 further comprising locating the recording program in a third-party host.

7. The method of recording calls as in claim 6 wherein the step of activating the recording program further comprises sending a transaction link message from the automatic contact distributor to the third-party host.

8. The method of recording calls as in claim 7 where the step of sending a transaction link message further comprises including at least one of an internet address of the agent and the client to the recording program.

9. The method of recording calls as in claim 8 further comprising using the internet address of the agent as a sniffing filter.

10. The method of recording calls as in claim 8 further comprising using the interne address of the client as a sniffing filter.

11. An apparatus for recording a VOIP call between a client and an agent through an automatic contact distributor comprising:
    means within the automatic contact distributor for receiving a recording request from a VoIP packet telephone of the agent, the VoIP packet telephone having a first VoIP network interface for exchanging voice packets and a second network interface for packet sniffing, each network interface having a different associate IP address;
    means within the automatic contact distributor for activating a recording program;
    means associated with the recording program for sniffing traffic within a packet telephone of the agent to detect packets of the VOIP call exchanged between the agent and client; and
    means within the recording program for recording the detected packets between the agent and customer.

12. The apparatus for recording calls as in claim 11 wherein the call further comprises a VoIP call and wherein the recording program utilizes a packet capturing tool provided within the agent VoIP packet telephone which is accessed via the second network interface.

13. The apparatus for recording calls as in claim 12 wherein the means with the automatic contact distributor for receiving the recording request further comprises means within the agent terminal for sending the recording request to the automatic contact distributor under a Session Initiation Protocol.

14. The apparatus for recording calls as in claim 11 further comprising means for joining a supervisor to the call.

15. The apparatus for recording calls as in claim 14 wherein the means for joining the supervisor to the call further comprises means for sending a Session Initiation Protocol INVITE message to an Internet telephone of the supervisor to notify the supervisor of the recording request and sending a Session Initiation Protocol JOIN message to the Internet telephone of the supervisor.

16. The apparatus for recording calls as in claim 12 further comprising means for locating the recording program in a third-party host.

17. The apparatus for recording calls as in claim 16 wherein the means for activating the recording program further comprises means for sending a transaction link message from the automatic contact distributor to the third-party host.

18. The apparatus for recording calls as in claim 17 where the means for sending a transaction link message further comprises means for including at least one of an internet address of the agent and the client to the recording program.

19. The apparatus for recording calls as in claim 18 further comprising means for using the internet address of the agent as a sniffing filter.

20. The apparatus for recording calls as in claim 18 further comprising means for using the internet address of the client as a sniffing filter.

21. An apparatus for recording a VOIP call between a client and an agent through an automatic contact distributor comprising:
 a recording processing program within the automatic contact distributor that receives a recording request from a VoIP packets telephone of the agent, the VoIP packet telephone having a first VoIP network interface for exchanging voice packets and a second packet network interface for packet sniffing, and that activates a recording program;
 a system analyzer associated with the recording program for sniffing traffic within a packet telephone of the agent using the second network interface to detect packets exchanged between the agent and client; and
 a recorder within the recording program for recording the detected packets of the VOIP call between the agent and customer.

22. The apparatus for recording calls as in claim 21 wherein the call further comprises a VoIP call and wherein the recording program utilized a packet capturing tool provided within the agent VoIP packet telephone which is accesses via the second network interface.

23. The apparatus for recording calls as in claim 22 wherein the recording processing program Session Initiation Protocol INVITE.

24. The apparatus for recording calls as in claim 21 wherein then network analyzer further comprises an internet address of the agent and the client used as filter parameters.

* * * * *